(12) United States Patent
Girault et al.

(10) Patent No.: US 7,822,199 B2
(45) Date of Patent: Oct. 26, 2010

(54) METHOD AND DEVICE FOR PERFORMING A CRYPTOGRAPHIC OPERATION

(75) Inventors: Marc Girault, Caen (FR); David Lefranc, Cormeilles-en-Parisis (FR)

(73) Assignee: France Telecom, Paris (FR)

( * ) Notice: Subject to any disclaimer, the term of this patent is extended or adjusted under 35 U.S.C. 154(b) by 267 days.

(21) Appl. No.: 10/590,794

(22) PCT Filed: Feb. 24, 2005

(86) PCT No.: PCT/FR2005/000443

§ 371 (c)(1),
(2), (4) Date: Sep. 18, 2006

(87) PCT Pub. No.: WO2005/096135

PCT Pub. Date: Oct. 13, 2005

(65) Prior Publication Data

US 2008/0137844 A1    Jun. 12, 2008

(30) Foreign Application Priority Data

Mar. 2, 2004    (FR) ................................. 0402146

(51) Int. Cl.
*H04L 9/00* (2006.01)
(52) U.S. Cl. ............... 380/44; 713/176; 713/192; 708/105; 708/209; 708/212; 708/523; 708/620
(58) Field of Classification Search ............ 380/30
See application file for complete search history.

(56) References Cited

U.S. PATENT DOCUMENTS

| | | | | |
|---|---|---|---|---|
| 4,338,675 A | * | 7/1982 | Palmer et al. | 708/510 |
| 4,878,027 A | * | 10/1989 | Carp et al. | 327/105 |
| 4,995,082 A | | 2/1991 | Schnorr | |
| 5,309,382 A | * | 5/1994 | Tamura et al. | 708/209 |
| 5,745,398 A | * | 4/1998 | Monier | 708/492 |
| 6,064,740 A | * | 5/2000 | Curiger et al. | 380/265 |
| 6,298,442 B1 | * | 10/2001 | Kocher et al. | 713/194 |
| 6,510,518 B1 | * | 1/2003 | Jaffe et al. | 713/168 |

(Continued)

FOREIGN PATENT DOCUMENTS

FR    2826531 A1  * 12/2002
WO    WO 0171675 A1  *  9/2001

OTHER PUBLICATIONS

Poupard and Stern, Security Analysis of a Practical "on the fly" Authentication and Signature Generation, 1998, Springer Verlag, LNCS 1403, pp. 422-436.*

(Continued)

*Primary Examiner*—William R Korzuch
*Assistant Examiner*—Michael R Vaughan
(74) *Attorney, Agent, or Firm*—Drinker Biddle & Reath LLP

(57) ABSTRACT

A method and device for performing a cryptographic operation by a device controlled by a security application executed outside thereof in which a cryptographic value (y) is produced a calculation comprising at least one multiplication between first and second factors containing a security key (s) associated with the device and a challenge number (c) provided by the security application. The first multiplication factor comprises a determined number of bits (L) in a binary representation and the second factor is constrained in such a way that it comprises, in a binary representation, several bits at 1 with a sequence of at least $L-1$ bits at 0 between each pair of consecutive bits to 1 while the multiplication is carried out by assembling the binary versions of the first factor shifted according to positions of the bits at 1 of the second factor, respectively.

23 Claims, 4 Drawing Sheets

U.S. PATENT DOCUMENTS

| | | | |
|---|---|---|---|
| 7,062,043 B1 * | 6/2006 | Solinas | 380/30 |
| 7,330,549 B2 * | 2/2008 | Girault | 380/44 |
| 2003/0093671 A1 | 5/2003 | Owlett | |
| 2003/0159038 A1 | 8/2003 | Gilbert et al. | |
| 2005/0084098 A1 * | 4/2005 | Brickell | 380/28 |
| 2006/0072743 A1 * | 4/2006 | Naslund et al. | 380/28 |

OTHER PUBLICATIONS

Girault et al., "Some Modes of Use of the GPS Identification Scheme", 2002, Third NESSIE Workshop.*

Baudron et al., "GPS, an asymmetric identification scheme for on the fly authentication of low cost smart cards", Oct. 12, 2001, NESSIE Project 2001.*

J. Stern and J. Stern. Cryptanalysis of the OTM signature scheme from FC'02. In Proceedings of the 7th Financial Cryptography Conference, 2003, 11 pages.*

I. Vajda and L. Buttyan. Lightweight Authentication Protocols for Low-Cost RFID Tags. In Second Workshop on Security in Ubiquitous Computing, Ubicomp 2003, 10 pages.*

* cited by examiner

METHOD AND DEVICE FOR PERFORMING A CRYPTOGRAPHIC OPERATION

CROSS-REFERENCE TO RELATED APPLICATIONS

This application is the U.S. national phase of the International Patent Application No. PCT/FR2005/000443 filed Feb. 24, 2005, which claims the benefit of French Application No. 04 02146 filed Mar. 2, 2004, the entire content of which is incorporated herein by reference.

FIELD OF THE INVENTION

The present invention relates to a method for performing a cryptographic operation in a device within the framework of a security application. In particular, the invention pertains to cryptographic methods of protection against fraud of an electronic chip in transactions between an external application and the chip.

BACKGROUND OF THE INVENTION

The invention finds a very advantageous application in that it makes it possible to protect against fraud of integrated circuit chips with hard-wired logic, in particular chips which are fitted to prepaid cards used in diverse transactions such as the setting up of telephone communications, the payment for objects in an automatic dispenser, the renting of parking slots from a parking meter, the payment for a service such as public transport or such as the making available of infrastructures (tolls, museums, libraries, etc.), or the chips which are fitted to radiofrequency tags ("RFID tags") used in the tracing of pallets, mass-consumption products, bank notes, etc.

At present, chips with hard-wired logic are apt to experience various types of fraud. A first type of fraud consists in duplicating the card without authorization, the term cloning often being used to characterize this operation. A second type of fraud consists in modifying the data attached to a card, in particular the amount of the credit registered in the card. To combat these frauds, cryptography is employed, on the one hand to ensure the authentication of the card by means of an authentication and/or to ensure the authentication of the data by means of a digital signature and, on the other hand to ensure as appropriate the confidentiality of the data by means of an encryption. Cryptography involves two entities, which are in the case of authentication a verifier and an object to be verified, and said cryptography may be either symmetric or asymmetric. When it is symmetric (or based on a "secret key", the two terms being synonymous), the two entities share exactly the same information, in particular a secret key. When it is asymmetric (or based on a "public key", the two terms being synonymous), one of the two entities possess a pair of keys, one of which is secret and the other public; there is no shared secret key. In numerous systems, in particular when the chip is of "hard-wired logic" type, only symmetric cryptography is implemented with prepaid cards, since asymmetric cryptography remains slow and expensive. The first authentication mechanisms developed in symmetric cryptography consist in calculating once and for all an authentication value, different for each card, in storing it in the memory of the card, in reading it at each transaction and in verifying it by interrogating an application of the network supporting the transaction where the authentication values already allocated are either stored or recalculated. These mechanisms ensure insufficient protection since the authentication value can be snooped, reproduced and replayed fraudulently given that it is always the same for a given card, thus making it possible to effect a clone of this card. To combat clones, passive mechanisms for authenticating cards are replaced by active authentication mechanisms which may moreover ensure the integrity of the data.

The general principle of symmetric active authentication mechanisms is as follows: during authentication, the electronic chip and the application calculate an authentication value which is the result of a function applied to a list of arguments that is determined at each authentication. The list of arguments may comprise a random number, that is to say a data item determined by the application at each authentication, a data item contained in the electronic chip and a secret key known to the electronic chip and to the application. When the authentication value calculated by the electronic chip is identical to the authentication value calculated by the application, the electronic chip is deemed to be authentic and the transaction between the electronic chip and the application is authorized.

Such authentication mechanisms are widely known but the majority require calculational capabilities at least equal to those of a microprocessor. These mechanisms are therefore suitable for microprocessor cards, but rarely for hard-wired logic chips, which have much more rudimentary means of calculation.

A first stage was reached when it was possible to integrate symmetric active authentication mechanisms into hard-wired logic chips. For example, FR-A-2 826 531 describes a method making it possible to specify such mechanisms. It will be noted that the authentication value produced by these mechanisms may also be interpreted as a sequence of pseudo-random bits and, by varying at least one of the input parameters, the method of calculating the authentication value then becomes a method of generating pseudo-random bits.

However, the secret key mechanisms make it necessary for the verification unit, in charge of the authentication of the chip, for example present in a public telephone, an electronic payment terminal, or else a public transport gateway, to know the secret key owned by said chip. This results in a major drawback, namely that if one wishes this unit to be able to authenticate any chip whatsoever, linked with the application, either it must store the secret keys of all the chips, or it must store a base key, also called a mother key or master key, making it possible to retrieve the secret key from any chip whatsoever. In both cases, each of these units stores sufficient information to be able to retrieve the secret keys of all the chips issued, and therefore stores sufficient information to be able to manufacture clones of any one of them. Therefore, a successful intrusion against any one of the verification units would wreck the security of the application as a whole.

There therefore exists an urgent need to be able to integrate an active mechanism of authentication with public key into a hard-wired logic chip, in particular in applications deploying a large number of chips, this generally being the case for applications using hard-wired logic chips, since they are very cheap.

Such mechanisms do not exist since the public key schemes generally require numerous operations pertaining to large numbers, thereby rendering them a priori unsuitable for integration into hard-wired logic chips, in which the silicon area is extremely small, and whose calculation logic reduces to the hard-wiring of extremely elementary operations. Moreover, these elementary operations are generally carried out in series, in the sense that the operands are introduced sequentially bit by bit, and that this introduction progressively modifies the state of an internal register whose final value serves as basis for the calculation of the result of the function.

For example, it is known to calculate an authentication value y by carrying out the operation y=r+s·c (or y=r−s·c), where r denotes a random item, s a secret key belonging to an asymmetric pair of keys (s, p), and c is a so-called "challenge" value chosen by the application, which cannot exceed a certain threshold, the value of r always having to remain greater than the number which is added to it (or subtracted from it). This entails the execution of at least one multiplication between a priori arbitrary integers s,c. Such a multiplication is, however, a relatively complex operation, outside the scope of most hard-wired logic chips.

An aim of the present invention is to define a method of calculating a cryptographic value, for example an authentication value, which is such that the chip does not have to explicitly carry out a multiplication operation and that the security level obtained is relatively significant, for example of the order of 32 bits, this being an extremely widespread level of security, especially in the protection of financial transactions.

SUMMARY OF THE INVENTION

The invention proposes a method for performing a cryptographic operation in a device under the control of a security application, in which a cryptographic value is produced in the device, by a calculation comprising at least one multiplication between two factors including a part at least of a secret key associated with the device. According to the invention, a first of the two factors of the multiplication has a determined number of bits L in binary representation, and the second of the two factors of the multiplication is constrained so that it comprises, in binary representation, several bits set to 1 with, between each pair of consecutive bits set to 1, a sequence of at least L−1 bits set to 0. The multiplication does not then need to be executed according to a complex algorithm. It suffices to carry it out by assembling binary versions of the first factor, respectively shifted in accordance with the positions of the bits set to 1 of the second factor.

According to other beneficial characteristics of the method of the invention:
the secret key forms part of an asymmetric cryptographic key pair associated with the device;
the device comprises a chip including hard-wired logic for producing the cryptographic value;
the calculation of the cryptographic value furthermore comprises an addition or a subtraction between a pseudo-random number and the result of the multiplication;
the first and second factors and the pseudo-random number are dimensioned so that the pseudo-random number is greater than the result of the multiplication, the number of bits set to 1 of the second factor being able, in particular, to be chosen at most equal to the largest integer less than or equal to $s_1/L$, where $s_1$ is a predefined threshold less than the number of bits of the pseudo-random number in binary representation;
the two factors of the multiplication include, as well as said part of the secret key, a number provided to the device by the security application executed outside the device;
said part of the secret key is either the first or the second factor of the multiplication;
when said part of the secret key is the first factor of the multiplication, said binary versions are disposed, for example, in respective intervals of like size in bits, said size corresponding to the total size of a usable space, divided by the number of bits set to 1 of the second factor of the multiplication, each binary version being placed in its respective interval as a function of a shift defined by the security application;
when the secret key is the second factor of the multiplication, it may be stored in a memory support of the device by coding numbers of bits separating respectively lower bounds of intervals of (S−1)/(n−1) bits and lower bounds of blocks of bits allotted to the first factor of the multiplication and each disposed in the associated intervals, S being the number of bits of the secret key and n the number of bits set to 1 of the secret key;
as a variant, this secret key may be stored in the memory support of the device by coding numbers of bits, each representative of the number of bits separating two blocks of successive bits allotted to the first factor of the multiplication;
when said part of the secret key is the second factor of the multiplication, it is stored in a memory support of the device by coding the positions of its bits set to 1;
when said part of the secret key is the second factor of the multiplication, the first factor may be a pseudo-random number generated in the device, the cryptographic value being produced in the guise of an electronic signature;
in another application, the cryptographic value is produced so as to authenticate the device in a transaction with the security application executed outside the device.

The invention also proposes a device with cryptographic function, comprising means of interfacing with a security application and means of calculation for producing a cryptographic value, the means of calculation comprising means of multiplication between two factors including a part at least of a secret key associated with the device. According to the invention, a first of the two factors of the multiplication has a determined number of bits L in binary representation, and the second of the two factors of the multiplication is constrained so that it comprises, in binary representation, several bits set to 1 with, between each pair of consecutive bits set to 1, a sequence of at least L−1 bits set to 0. The multiplication means comprise means for assembling binary versions of the first factor, respectively shifted in accordance with the positions of the bits set to 1 of the second factor.

An advantage of the present invention is to obtain a good level of security of devices using cryptography to protect themselves against fraud, especially during transactions between a hard-wired logic electronic chip and a security application external to the electronic chip.

Another advantage of the invention is its simplicity of implementation since it does not require expensive means of multiplication which are difficult to implement in an electronic chip on account of its small size, the means of multiplication being replaced by means of addition for summing the shifts of the secret key or of the challenge. Specifically, the multiplication of an integer by a power of two amounts to shifting the bits of the binary decomposition leftwards.

BRIEF DESCRIPTION OF THE DRAWINGS

Other features and advantages of the present invention will become apparent in the following description of nonlimiting exemplary embodiments, with reference to the appended drawings, in which.

DETAILED DESCRIPTION OF THE INVENTION

Figure 1:
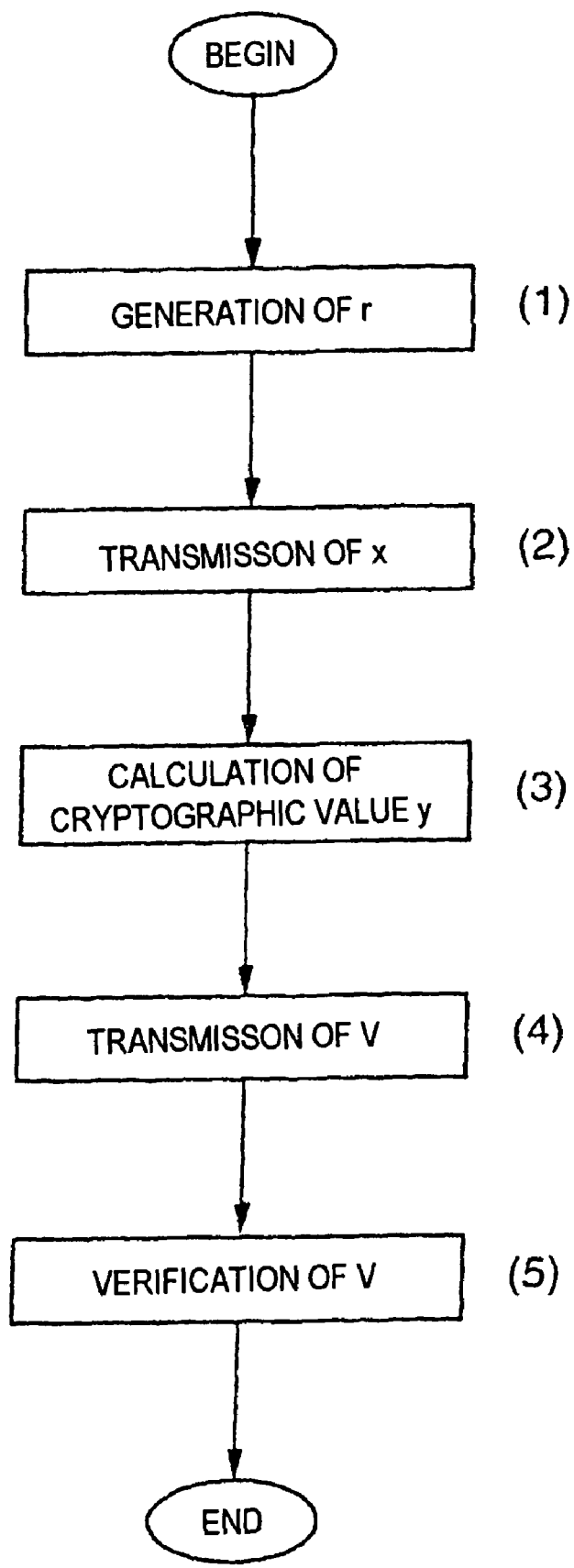
FIG. 1 illustrates a flowchart describing an embodiment of a cryptographic authentication.

FIG. 1 illustrates a flowchart of a method for executing a cryptographic operation in a device, especially an electronic chip with hard-wired logic, under the control of a security application executed outside the device.

In particular, such a method is applied in transactions between the electronic chip and the application. However, it may also be used for the calculation of a cryptographic value constituting a digital signature.

In a first step 1, the method consists in generating in the electronic chip a pseudo-random number r termed a random item by means of a pseudo-random generator included in the electronic chip. The random item r is specific to a transaction.

In a second step 2, the method consists in transmitting from the electronic chip to the security application a parameter x related to the random item r on the basis of a function f such that x=f(r), f being associated with a public key know to the electronic chip and to the security application. Parameters x may be calculated in advance and stored in a memory of the chip, each parameter x being associated respectively with a pseudo-random number r.

By way of example, g being a number known to the security application, the function f may conventionally be of the form: $x=f(r)=g^r$. Another possibility, also well known to the person skilled in the art, is to use in the function f a cryptographic hash function h as well as data D related to the application (for example a transaction amount): $x=f(r)=h(g^r, D)$. Other examples of function f are also usable.

In a third step 3, the method consists in calculating in the electronic chip a cryptographic value y, in accordance with the inventive method described later, by means of multiplication having for input parameters at least the random item r specific to the transaction and a secret key belonging to a pair of asymmetric keys (s, p), for example with $p=g^s$. The cryptographic value constitutes all or part of an authentication value V.

In a fourth step 4, the method consists in transmitting the authentication value V to the application.

In a fifth step 5, the method consists in verifying by the security application the authentication value V by means of a verification function whose input parameters are composed of public parameters, containing at least the public key p. If the authentication value is validated by the security application, the transactions are authorized.

The present invention is aimed at calculating a cryptographic value y by performing an operation of the type $y=r+f_1*f_2$ (or equivalently $y=r-f_1*f_2$) where r denotes a random item calculated by a pseudo-random generator included in the electronic chip and ($f_1$, $f_2$) a pair of factors including the secret key s and a so-called challenge number c provided by the security application. The binary representations of the factors $f_1$, $f_2$ are such that the factor $f_1$ has a size in bits denoted L and that the successive bits set to 1 of the factor $f_2$ always have between them a sequence of at least L−1 bits set to 0.

Thus, the multiplication of the factors $f_1$, $f_2$ amounts to summing a number n of binary versions b[1], b[2], . . . , b[n] of the first factor $f_1$ respectively shifted in accordance with the positions of the bits set to 1 of the second factor $f_2$. The number n is dependent on the number of bits set to 1 of the second factor $f_2$. Given these shifts, the sum $$\sum_{h=1}^{n} b[h]$$

is carried out very simply by assembling the b[h] values into a binary number representing the result of the multiplication.

In the following description, a first embodiment of the method of the invention is described in which the factor $f_1$ is the secret key s of L bits and the second factor $f_2$ is the pseudo-random challenge c provided by the security application. Thus, the cryptographic value y is determined by performing the operation:

$$y=r+s*(2^{i[1]}+\ldots+2^{i[n]})$$

where i [1], . . . , i[n] denote n integers chosen by the application with two constraints:

the values i [1], . . . , i [n] must all remain less than or equal to a threshold denoted $s_1$ so that the value r always remains greater than the number which is added to it (or subtracted from it), said threshold then defining a usable space over the bits of r.

the second constraint consists in requiring the various values i [1], . . . , i [n] to be a distance apart at least equal to the size in bits of the secret key.

Thus, the secret key s being composed of L bits, and assuming the various integers i[1], . . . , i[n] arranged in ascending order, the security application provides these values i[1], . . . , i[n] such that i[1]+L≦i[2], i[2]+L≦i[3], . . . , i[n−1]+L≦i[n] and i[n]<$s_1$.

Thus, the number n of bits set to 1 of the second factor is chosen at most equal to the largest integer less than or equal to $s_1$/L.

A maximum denoted u, which will generally not be very high, for example u=5 or 6, is imposed on the value of n by the two constraints. Preferably, the value of n will be taken equal to the maximum u.

Figure 2:
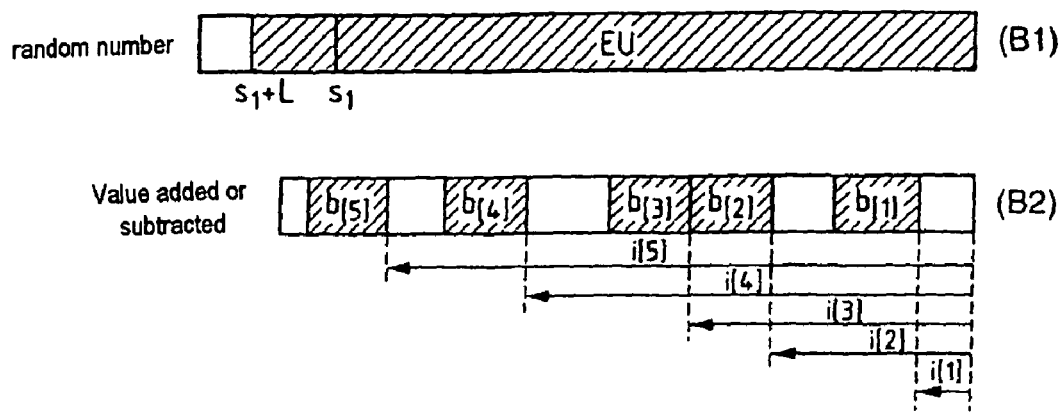
FIG. 2 illustrates an embodiment of the method of the invention.

FIG. 2 illustrates an exemplary use of the method of the invention with n=5. Diagram B1 represents the random item r with the usable space EU of size L+$s_1$ bits. Diagram B2 represents the result of the multiplication $s*c=s*(2^{i[1]}+\ldots+2^{i[n]})$, added to (or subtracted from) r. The secret key s is shifted in accordance with the positions of the bits set to 1 of the challenge c. One thus obtains the binary versions b1 to b5 respectively shifted by i[1], i[2], i[3], i[4] and i[5] bits.

An advantage of the present invention rests upon the gain in security obtained with such a method, since guessing the various values of the integers i [h], and possibly the number n itself if it is not fixed by the security application, is very difficult.

Another advantage is that the gain in security is achieved without significantly complicating the calculation of the cryptographic value y since the multiplication between the secret key and the challenge amounts to assembling shifts (or binary versions) in accordance with the invention, the calculation being performed serially.

According to a first variant of the method, the n shifts of the secret key are required to be all placed in intervals of like size. This size is desired to be maximal, this signifying that it is equal to the total size of the usable space EU, divided by n, or, if this value is not an integer, the largest integer which is less than it. The discrepancies, chosen by the application, between the blocks of bits corresponding to the shifts of the secret key and the lower bound of the interval in which these associated blocks are situated will be denoted j[1], j[2], ..., j[n].

More formally, let k be the total size of the usable space (equal to $s_1+L$), n is then the number of times that one wishes to make the secret key appear in a disjoint manner among the k usable bits. It is assumed that k is divisible by n (in the converse case, the value of k is increased slightly so that this holds).

The total usable space may be decomposed into n intervals of like size each containing k/n positions as follows:

[0,k/n−1]∪[k/n,2 k/n−1]∪ ... ∪[(n−1)k/n,k−1]

With the use of the present variant, it is possible to demonstrate that there are in total $((k/n)-L+1)^n$ different values that can be added to the random item r.

Specifically, each interval contains k/n positions of which L are used to write the shift of the secret key. There therefore remain k/n−L free positions in each interval to be distributed about the block of bits used by the shift. Thus, for any h such that $1 \leq h \leq n$, j[h] is a value lying between 0 and (k/n)−L and corresponds to the number of bits between the (h−1) (k/n)-th position and the position of the first bit of the shift. There are therefore (k/n)−L+1 possible values for each j[h]. Finally, the number of different n-tuples (j [1], j[2], ..., j [n]) is $((k/n)-L+1)^n$.

Stated otherwise, the cryptographic value y is calculated by performing the operation:

$$y=r+(2^{j[1]}\cdot s+2^{k/n+j[2]}\cdot s+2^{2k/n+j[3]}\cdot s+\ldots+2^{(n-1)k/n+j[n]}\cdot s)$$

where the n values j [1], j [2], ..., j [n] are chosen by the security application in such a way that j [h]∈[0, (k/n)−L] for all h.

Each binary version b[h] is therefore shifted by j [h] bits with respect to the lower bound of the interval.

Figure 3:
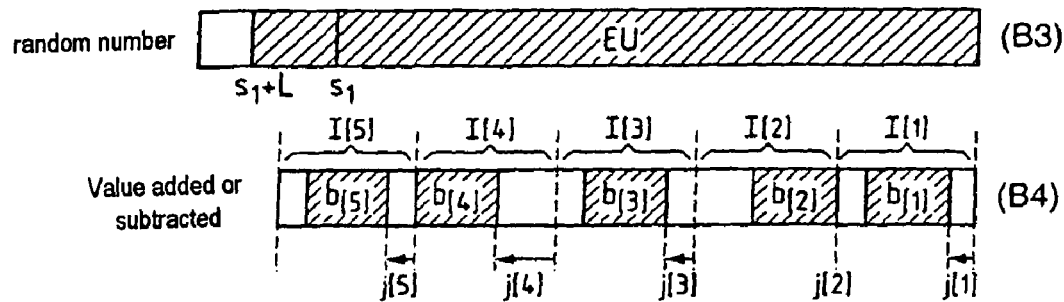
FIG. 3 illustrates a first variant embodiment of the method of the invention.

In FIG. 3, I[h]=[(h−1)k/n, hk/n−1] denotes the h-th interval in a particular case of the first variant embodiment where n=5. The diagram B3 represents the random item r with the usable space EU, while diagram B4 represents the value added (or subtracted). One thus obtains binary versions b[h] of the secret key s, namely b[1], b[2], b[3], b[4] and b[5], respectively disposed in the intervals I[h]. Each binary version b[h] is shifted by j [h] bits with respect to the lower bound of the associated interval I[h].

According to a second variant of the method of the invention, the n values of discrepancies j[1], j[2], ..., j[n] are chosen by the security application in such a way as to represent the differences between two consecutive blocks corresponding to two shifts of the secret key. As in the first variant, the n values may be taken in the interval [0, (k/n)−L).

The cryptographic value is thus calculated by performing the operation:

$$y=r+(2^{j[1]}\cdot s+2^{L+j[1]+j[2]}\cdot s+2^{2L+j[1]+j[2]+j[3]}\cdot s+\ldots+2^{(n-1)L+j[1]+j[2]+\ldots+j[n]}\cdot s).$$

Figure 4:
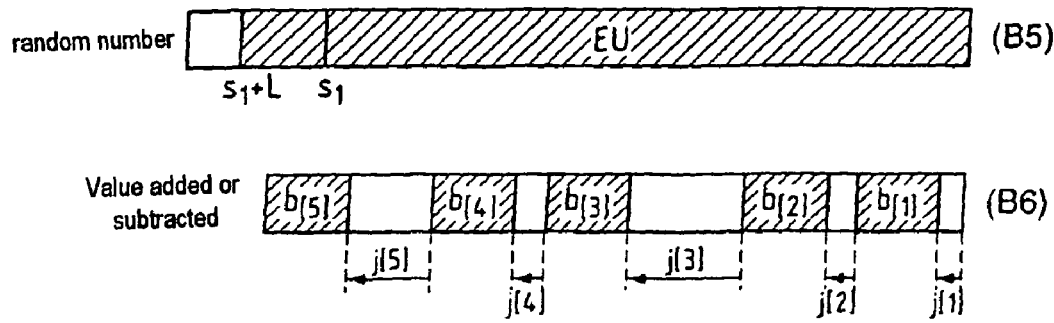
FIG. 4 illustrates a second variant embodiment of the method of the invention.

FIG. 4 illustrates an exemplary use of the second variant of the method of the invention where n=5. Diagram B5 represents the random item r with the usable space EU, while diagram B6 represents the value added (or subtracted). One thus obtains five binary versions b[1], b[2], b[3], b[4] and b[5], of the secret key s, mutually shifted by j[1], j[2], j[3], j[4] and j[5] bits, respectively.

In certain cases, it will be possible to slightly relax the constraint on the number of bits set to 0 having to separate two consecutive bits set to 1 of the challenge c, at the cost of a moderate increase in the complexity of the hard-wired logic of the chip, without departing from the framework of the present invention. Let us consider for example the case where the secret key $s=f_1$ of the device is a number of L bits with n=6. If one imposes the condition that two consecutive bits set to 1 of the challenge $c=2^{i[1]}+2^{i[2]}+2^{i[3]}+2^{i[4]}+2^{i[5]}+2^{i[6]}$ are always separated by a sequence of at least L/2 bits set to 0 (that is to say that i[1]+L/2<i[2], ..., i[5]+L<i[6]<$s_1$, it is easy to decompose this challenge into two terms: $c=f_2+f'_2$, or $f_2=2^{i[1]}+2^{i[3]}+2^{i[5]}$ and $f'_2=2^{i[2]}+2^{i[4]}+2^{i[6]}$. Each of these two terms $f_2$, $f'_2$ satisfies the condition required to be the second factor of the multiplication in the method according to the invention: i[1]+L<i[3]<i[5]−L for $f_2$ and i[2]+L<i[4]<i[6]−L for $f'_2$. The cryptographic operation to be performed may be written $y=r+s\cdot f_2+s\cdot f'_2$, each of the two multiplications $s\cdot f_2$, $s\cdot f'_2$, being achievable by assembling shifted versions of s in accordance with the invention. The hard-wired logic must then comprise two adder (or subtractor) circuits.

In another embodiment of the invention, the roles of s and of c in the multiplication are reversed: the first factor $f_1$ is the pseudo-random number c, while the second factor $f_2$ is the secret key s. The cryptographic value y is therefore calculated by performing the operation:

$$y=r+c*(2^{i[1]}+\ldots+2^{i[n]})$$

where r denotes a random item, c the challenge chosen by the security application, and the n values i[1], ..., i[n] correspond to the positions of the nonzero bits of the secret key s associated with the device, or of a part of this secret key. Stated otherwise, the secret key s is $2^{i[1]}+2^{i[2]}+\ldots+2^{i[n]}$. The n values i[1], ..., i[n] must satisfy the same constraints as those presented during the first embodiment.

The method for the calculation of such a cryptographic value is identical to that previously presented in the first embodiment.

However, the secret key $s=2^{i[1]}+2^{i[2]}+\ldots+2^{i[n]}$ remains identical for all authentications, as is a conventional secret key. Two cases may arise in respect of the use of this second embodiment:

the secret key is dedicated to a particular application requiring a constant level of security $L_0$. In this case, the construction of the secret key is achieved by using a secret key s with nonzero bits separated by at least ($L_0$−1) bits; or the secret key is used in various applications requiring different levels of security. It is then necessary to consider the largest level of security. Specifically, in the converse case, the construction of a key with nonzero bits separated by ($L_0$−1) bits may give rise to challenges of size $L_1>L_0$, so that the shifts of the challenge would no longer be disjoint. Hence the need to have nonzero bits of the secret key separated by at least L−1 bits, where L represents the maximum level of security that may be encountered during the use of the secret key s.

To store the secret key, a first solution consists in storing it in its totality. However, given the size of the secret key due to the high level of security, physical constraints, particularly the size of the memory of the electronic chip, limit the possible storage size, in particular for economic reasons.

A second solution consists in profiting from the structure of the secret key of the type $2^{i[1]}+2^{i[2]}+\ldots+2^{i[n]}$, by storing only the positions of the nonzero bits of the secret key. This second solution can be improved, so as to store even fewer bits. Two procedures are possible.

Let S be the size of the secret key having n nonzero bits, assuming that S−1 is divisible by n−1. A first nonzero bit is placed at the position S−1 to obtain a secret of the desired size. Thereafter, the other S−1 bits of the secret key are chopped into n−1 intervals I[1], I[2], . . . , I[n−1] of (S−1)/(n−1) bits.

In each of the intervals I [h], one places a block of bits which is allotted to the block of bits representing the challenge of size L. Each interval therefore contains (S−1)/(n−1)−L unused bits which spread out to the left and to the right of the allotted block of bits. At the maximum, (S−1)/(n−1)−L bits may be placed between the lower bound of the interval and the allotted block.

Thus, instead of storing the position i[h] of the nonzero bits, it is possible to store the number of bits p[h] located between the lower bound of each interval and said allotted block of bits located in the interval considered.

Figure 5:
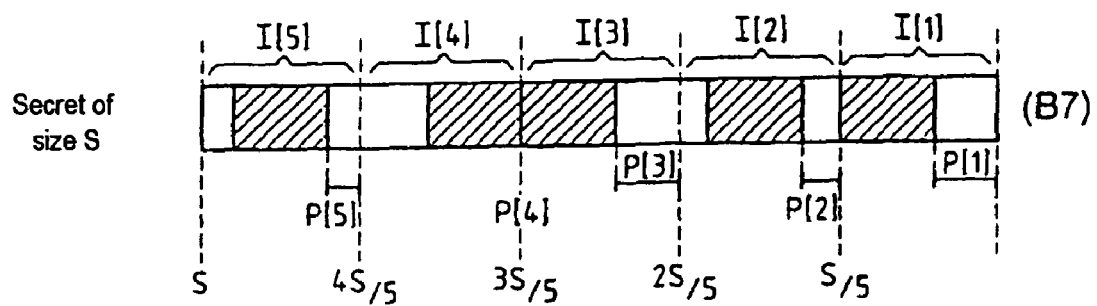
FIG. 5 illustrates a first variant of storing a secret key according to the invention.

FIG. 5 illustrates an exemplary storage of a secret key having five nonzero bits. Hence, the numbers of bits p[1], p[2], p[3], p[4] (in the example zero) and p[5] are stored.

The second procedure consists in storing the number of bits located between two consecutive blocks of bits allotted to the block relating to the challenge and the number of bits located at each end (before the first block allotted and after the last block allotted).

Figure 6:
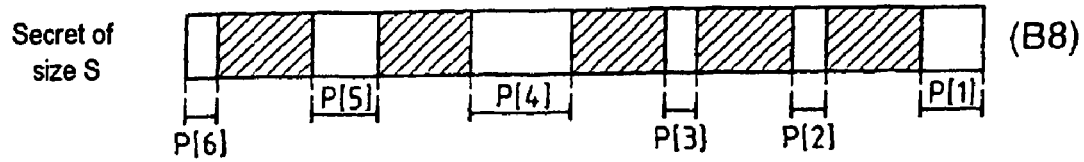
FIG. 6 illustrates a second variant of storing a secret key according to the invention.

FIG. 6 illustrates the present procedure in the case where the secret key contains five nonzero bits. Thus the values p[1], p[2], p[3], p[4], p[5] and p[6] are stored on a memory support of the electronic chip. This example is nonlimiting and some values p[h] may be zero.

In the second embodiment of the invention, it is also possible in certain cases to slightly relax the constraint on the number of bits set to 0 having to separate two consecutive bits set to 1 of the key s, at the cost of a moderate increase in the complexity of the hard-wired logic of the chip, without departing from the scope of the present invention.

The method of the invention is usable to calculate a cryptographic value to protect against fraud of a device, especially a hard-wired logic electronic chip, under the control of a security application external to the device, in transactions between these to entities.

Such a method is also usable to calculate a cryptographic value as constituting a digital signature. In this case, the number c, the so-called challenge, is not provided by the security application but is calculated by the electronic chip in accordance with a message to be signed.

Figure 7:
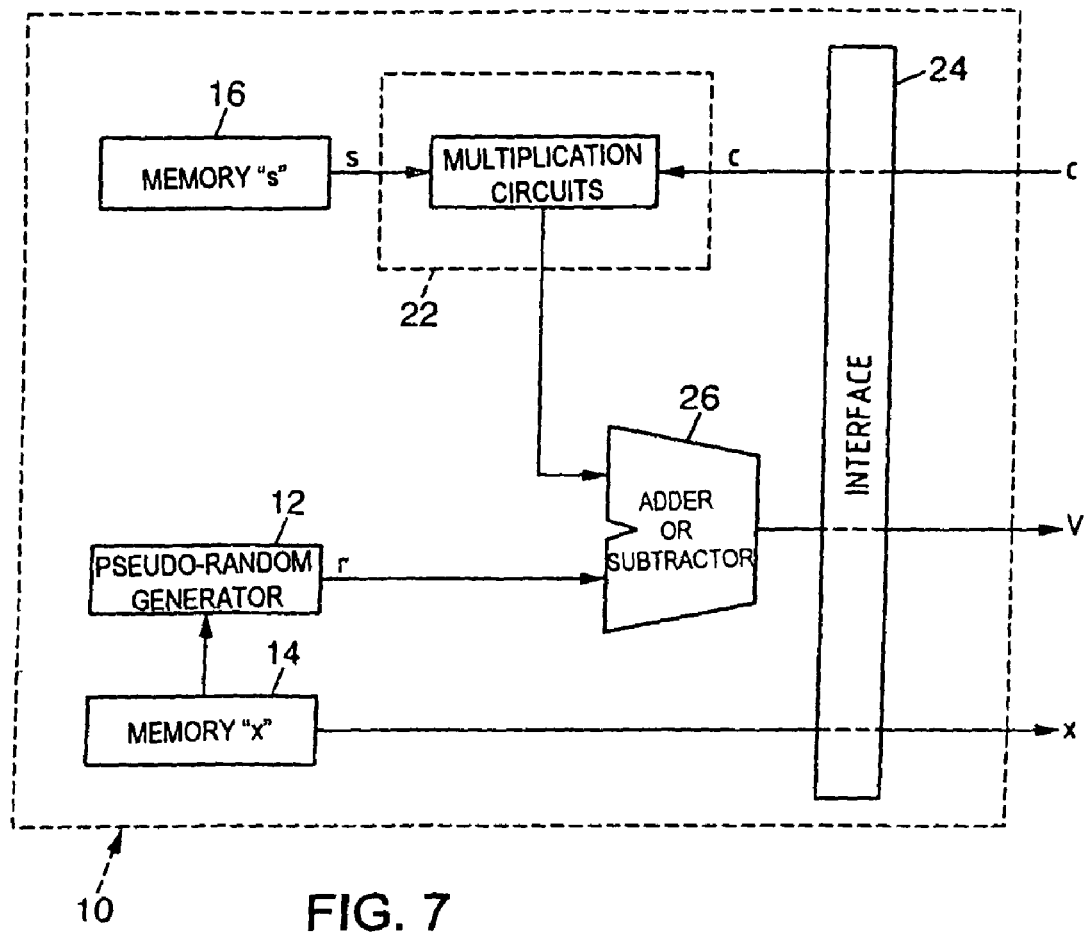
FIG. 7 illustrates an exemplary device with cryptographic function implementing the first embodiment of the invention.

FIG. 7 illustrates an exemplary device with cryptographic function implementing the first embodiment of the invention.

The device 10, such as an electronic chip, comprises:

a pseudo-random number generator 12 producing a random item r specific to a transaction, the random item r being related to an associated parameter x;

a first memory 16 for storing the secret key s;

a second memory 14 for storing the parameters x;

an interface 24 for exchanging data with the external security application, in a manner known per se;

a circuit 22 for multiplication between the secret key s and the challenge c; and an adder 26, (or a subtractor) for arithmetically combining the result of the multiplication and the pseudo-random number emanating from the generator 12.

In the embodiment illustrated by FIG. 7, the multiplication circuit 22 shifts the first factor f1, particularly the secret key s, in accordance with the requirements of the invention, then sequentially transmits bit by bit the result obtained to the adder 26.

In parallel, the pseudo-random generator 12 sequentially transmits bit by bit the random item r to the adder 26.

The adder 26 thus adds sequentially bit by bit the random item r and the result provided by the multiplication circuit 22.

The various means included in the device 10 are embodied as hard-wired logic.

Figure 8:
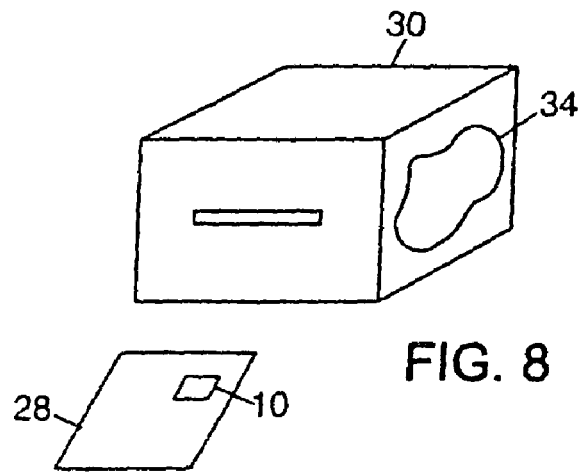
FIG. 8 illustrates an exemplary use of a device with cryptographic function according to the invention.

Such a device 10 is mounted, as described in FIG. 8, on a support 28 in the format of a credit card for example. The support 28 may for example be inserted into a reader 30 hosting the security application 34.

In an exemplary application, the insertion of the support 28 into the reader 30 automatically activates the security application 34 which invokes the electronic chip and transmits data to it, particularly the challenge c. The electronic chip authenticates itself by providing it with a cryptographic value y (or V) calculated according to the method of the invention. As described in FIG. 1, a parameter x related to r is transmitted to the security application.

On the basis of the values x and V (or y), the security application then proceeds to verification.

In a conventional manner, when the parameter x is of the form $x=g^r$, the equation satisfied by the security application may be of the form $g^y = x \cdot p^c$ when the cryptographic value is of the form $y=r+sc$, or $g^y \cdot p^c = x$ if the cryptographic value is of the form $y=r-sc$.

In the case where the parameter x conveys a hash function ($x=h(g^r, D)$), the verification equation is conventionally $h(g^y/p^c, D)=x$ when the cryptographic value is of the form $y=r+sc$. Preferably, a cryptographic value of the form $y=r-sc$ is then used, so that the verification equation does not involve any divisions: $h(g^y \cdot p^c, D)=x$.

When the authentication value is validated, the authentication of the chip is correct and the security application informs the electronic chip thereof. The transactions between the security application and the electronic chip are thus authorized.

The invention claimed is:

1. A method for performing a cryptographic operation in a device comprising an integrated circuit card under control of a security application, in which at least a part of a cryptographic value (y) is produced in the integrated circuit card, by a calculation utilizing a processor comprising at least one multiplication operation between a first ($f_1$) and a second ($f_2$) factor wherein one of said first and second factors includes a part that is a secret key (s) associated with the device, wherein said first factor ($f_1$) comprises a determined number of bits L in a first binary representation, wherein said second factor ($f_2$) comprises, in a second binary representation, several bits set to 1 with, between each pair of consecutive bits set to 1, a sequence of at least L−1 bits set to 0, the method comprising:

obtaining a plurality (n) of successive binary versions of the first factor by shifting said first factor in accordance with the positions of the bits set to 1 of the second factor;

carrying out the at least one multiplication operation by assembling said n successive binary versions of the first factor to produce said at least a part of the cryptographic value; and utilizing said at least part of the cryptographic value in a cryptographic exchange of information or a cryptographic security operation.

2. The method as claimed in claim 1, in which the secret key (s) forms part of an asymmetric cryptographic key pair associated with the device.

3. The method as claimed in claim 1, in which the device comprises a chip including hard-wired logic for producing the cryptographic value.

4. The method as claimed in claim 1, in which the calculation of the cryptographic value furthermore comprises an addition or a subtraction between a pseudo-random number (r) and the result of the multiplication.

5. The method as claimed in claim 4, in which the first and second factors ($f_1$, $f_2$) and the pseudo-random number (r) are dimensioned so that the pseudo-random number is greater than the result of the multiplication.

6. The method as claimed in claim 5, in which the number of bits set to 1 of the second factor is chosen at most equal to the largest integer less than or equal to $s_1/L$, where $s_1$ is a predefined threshold less than the number of bits of the pseudo-random number (r) in binary representation.

7. The method as claimed in claim 1, in which the two factors of the multiplication include, as well as said part of the secret key (s), a number (r) provided to the device by the security application executed outside the device.

8. The method as claimed in claim 1, in which the two factors of the multiplication include, as well as said secret key (s), a number (r) provided by the device.

9. The method as claimed in claim 1, in which said part of the secret key (s) is said first factor ($f_1$) of the multiplication.

10. The method as claimed in claim 1, the method further comprising:
    calculating intervals of like size in bits, said size corresponding to the total size of a usable space divided by the number of bits set to 1 of the second factor of the multiplication operation;
    placing each shifted binary version in its respective interval as a function of a shift in accordance with the positions of the bits set to 1 of the second factor.

11. The method as claimed in claim 1, in which said part of the secret key (s) is the second factor ($f_2$) of the multiplication.

12. The method as claimed in claim 11, in which the secret key (s) is stored in a memory support of the device by coding the positions of its bits set to 1.

13. The method as claimed in claim 11, in which the secret key (s) is stored in a memory support of the device by coding numbers of bits separating respectively lower bounds of intervals of $(S-1)/(n-1)$ bits and lower bounds of blocks of bits allotted to the first factor ($f_1$) of the multiplication and each disposed in the associated intervals, S being the number of bits of the secret key (s) and n the number of bits set to 1 of the secret key (s).

14. The method as claimed in claim 11, in which the secret key (s) is stored in a memory support of the device by coding numbers of bits, each representative of the number of bits separating two blocks of successive bits allotted to the first factor ($f_1$) of the multiplication.

15. The method as claimed in claim 1, in which the cryptographic value (y) is used for authenticating the device in a transaction with the security application executed outside the device.

16. The method as claimed in claim 1, in which the cryptographic value (y) is used in the guise of electronic signature.

17. A device with cryptographic function, comprising:
    means of interfacing with a security application; and
    an integrated circuit card as a means of calculation for producing at least a part of a cryptographic value (y), that is utilized in a cryptographic exchange of information or cryptographic security operation, the means of calculation comprising:
        circuitry for multiplication between a first ($f_1$) and second ($f_2$) factor wherein one of said first and second factors includes a part that is a secret key (s) associated with the device,
        wherein the first factor ($f_1$) comprises a determined number of bits L in a first binary representation and the second factor ($f_2$) comprises, in a second binary representation, several bits set to 1 with, between each pair of consecutive bits set to 1, a sequence of at least L−1 bits set to 0, wherein said at least a part of a cryptographic value (y) comprises a result of the multiplication between the first and second factors, wherein the means of multiplication comprises means for assembling a plurality (n) of successive binary versions of the first factor, wherein said n successive binary versions are obtained by shifting said first factor in accordance with the positions of the bits set to 1 of the second factor.

18. The device as claimed in claim 17, furthermore comprising means of generating a pseudo-random number (r), the means of calculation comprising means for adding the result of the multiplication to or subtracting it from said pseudo-random number.

19. The device as claimed in claim 18, in which the first and second factors ($f_1$, $f_2$) and the pseudo-random number (r) are dimensioned so that the pseudo-random number is greater than the result of the multiplication.

20. The device as claimed in claim 17, in which the means of calculation are embodied as hard-wired logic.

21. The device as claimed in claim 17, in which said part of the secret key (s) is the first factor ($f_1$) of the multiplication.

22. The device as claimed in claim 17, in which said part of the secret key (s) is the second factor ($f_2$) of the multiplication.

23. The device as claimed in claim 22, furthermore comprising a memory adapted for storing data for coding the positions of the bits set to 1 of the secret key (s).

* * * * *